US 6,587,469 B1

(12) United States Patent
Bragg

(10) Patent No.: US 6,587,469 B1
(45) Date of Patent: Jul. 1, 2003

(54) TELECOMMUNICATIONS SYSTEM

(75) Inventor: Nigel Lawrence Bragg, Weston Colville (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/294,708

(22) Filed: Apr. 19, 1999

(30) Foreign Application Priority Data

May 15, 1998 (GB) .............................. 9810583

(51) Int. Cl.[7] .............................. H04L 12/28
(52) U.S. Cl. .................. 370/401; 370/401; 370/352; 370/399
(58) Field of Search .................. 370/398, 13, 351–352, 370/395.1, 395.6, 389, 468, 474, 465, 401, 400, 466, 498, 397, 399, 254, 364, 229, 230, 236

(56) References Cited

U.S. PATENT DOCUMENTS 5,313,454 A * 5/1994 Bustini et al. ............ 370/13
5,809,021 A * 9/1998 Diaz .......................... 370/364
5,926,463 A * 7/1999 Ahern ........................ 370/254
6,134,235 A * 10/2000 Goldman .................... 370/352
6,185,214 B1 * 2/2001 Schwartz. ................... 370/401
6,259,699 B1 * 7/2001 Opalka ....................... 370/398

FOREIGN PATENT DOCUMENTS

| GB | WO 98/17034 | * | 4/1998 | .............. 370/351 |
| WO | 98/17034 | | 4/1998 | |

* cited by examiner

Primary Examiner—Dang Ton
Assistant Examiner—Robert W. Wilson
(74) Attorney, Agent, or Firm—Barnes & Thornburg

(57) ABSTRACT

A router in an IP (Internet protocol) network supporting a number of virtual private networks is partitioned by a divider unit. Each virtual private network has its respective control architecture. The divider unit allocates forwarding resources assigned to each control architecture so as to limit the amount of resources consumed by each control architecture and guarantee pre-set minimum amounts of those resources.

13 Claims, 2 Drawing Sheets

TELECOMMUNICATIONS SYSTEM

This invention relates to telecommunications systems and in particular to traffic routing in IP (Internet protocol) networks.

BACKGROUND OF THE INVENTION

In conventional telecommunications networks, user traffic is carried between terminals by the setting up of circuits or connections therebetween. Within those networks, switches are used to set up the required connections and to provide appropriate routing of traffic. The networks have developed using a number of different control architectures, and provision has been made for interworking between these different architectures. For example, in the ATM (asynchronous transfer mode) field, a recent development has been the concept of a switch that can be partitioned between a number of different control architectures by means of a divider unit. Such an arrangement is described in specification No PCT/GB97/02802. In the switch described in this specification, those switch resources which need to be partitioned by a divider unit comprise:

Address space (VPI/VCI) on each physical port
Buffer space allocated to each partition by class of service
Switch bandwidth allocated to each partition by class of service There is now an increasing interest in building IP (Internet protocol) networks to carry user traffic with different qualities of service (QoS) to enable preference to be given to certain types of traffic, particularly voice traffic. Within these IP networks, traffic is carried in packets which are individually routed from a source to a desired destination. Such networks are generally referred to as connectionless networks. Routers that are typically used to build IP networks are becoming similar in architecture to switches, and comprise a forwarding path which routes the majority of the user traffic, and a route server which executes the protocols used to determine the routes to be used by the user traffic and which loads routing tables within the forwarding path. It would of course be of advantage to extend the switch divider or partitioning concept described above to an IP router, but the manner in which this may be effected is by no means apparent.

In an ATM switch, the forwarding decision is a simple process. The VPI/VCI of an incoming cell is used to index into a table that defines the egress port and egress VPI/VCI or other egress context identifier. In an IP router however, the forwarding decision is more complex as it requires both the identification of the longest matching IP address in a table of indeterminate size and the processing of other packet header fields in order to correctly forward packets in accordance with pre-defined policies. The latter requires an indeterminate processing resource on a per packet basis.

Further, a divider in an ATM switch can exploit two key ATM attributes to minimise the complexity of switch bandwidth allocation and control. These are the connection oriented nature of ATM and the association of most ATM service classes with quality of service. These two attributes allow and mandate a call admission control process whereby a new call is accepted only if its quality of service requirements can be accommodated without prejudicing the quality of service guarantees already given to existing calls. The divider abstraction in an ATM switch exploits these attributes by partitioning the proportion of bandwidth on each switch port allocated to each ATM service class between control architectures and monitors invocations on the switch to ensure that no invocation would cause the bandwidth bound of the initiating control architecture to be exceeded. This monitoring includes the necessary checks to ensure that the ingress traffic policing functions of the underlying hardware have been correctly set to protect the switch from aberrant behaviour of traffic sources. Neither of the above attributes are available in an IP router, as the standard connectionless protocols have no inherent call admission process and the dominant traffic flows are elastic with no quality of service demands. Further, these traffic flows use protocols such as TCP to maximise use of available bandwidth while competing fairly with other flows under congestion conditions.

SUMMARY OF THE INVENTION

An object of the invention is to minimise or to overcome the above disadvantage.

According to a first aspect of the invention, there is provided an IP (Internet protocol) router incorporating divider means adapted to control allocation of packet forwarding resources to a plurality of control architectures.

According to another aspect of the invention there is provided an IP (Internet protocol) router incorporating divider means adapted to merge routing tables from each of a plurality of control architectures into a single routing table on a forwarding path.

Advantageously, the divider unit ensures that predetermined limits on the amount of routing table resource consumed by each control architecture are not exceeded.

The divider unit has functionality to merge the routing tables from each control architecture into one or more routing tables for use within the forwarding path while ensuring that the predetermined limit on the size or amount of the routing table resource consumed by each control architecture is not exceeded.

According to another aspect of the invention there is provided an IP (Internet protocol) network, including a plurality of routers, each said router incorporating divider means adapted to merge routing tables from each of a plurality of control architectures into a single routing table on a forwarding path.

According to another aspect of the invention there is provided a divider unit for an IP (Internet protocol) router, said divider unit incorporating divider means for merging routing tables from each of a plurality of control architectures into a single routing table on a forwarding path.

According to a further aspect of the invention, there is provided an IP (Internet protocol) router having a plurality of ports, each embodying a respective number of virtual ports, and incorporating divider means adapted to control bandwidth allocated to each said virtual port.

In a preferred embodiment, the divider has means for detecting overload and output blocking of a virtual port whereby to control traffic ingress to the router.

According to a further aspect of the invention, there is provided a method of operating a partitioned router in IP (Internet Protocol) network embodying a plurality of virtual private networks, each said private network having its respective control architecture and having a respective set of virtual egress ports on the router, the method including assigning forwarding processing resources to each partition of the router such that each said control architecture is guaranteed a predetermined amount of said forwarding resources.

In a preferred embodiment, a forwarding routing table is provided for each virtual private network and the size of those tables is controlled by the partition.

At least some of the virtual private networks may carry voice traffic so as to provide voice over Internet services.

BRIEF DESCRIPTION OF THE DRAWINGS

An embodiment of the invention will now be described with reference to the accompanying drawings in which.

DESCRIPTION OF PREFERRED EMBODIMENT

Figure 1:
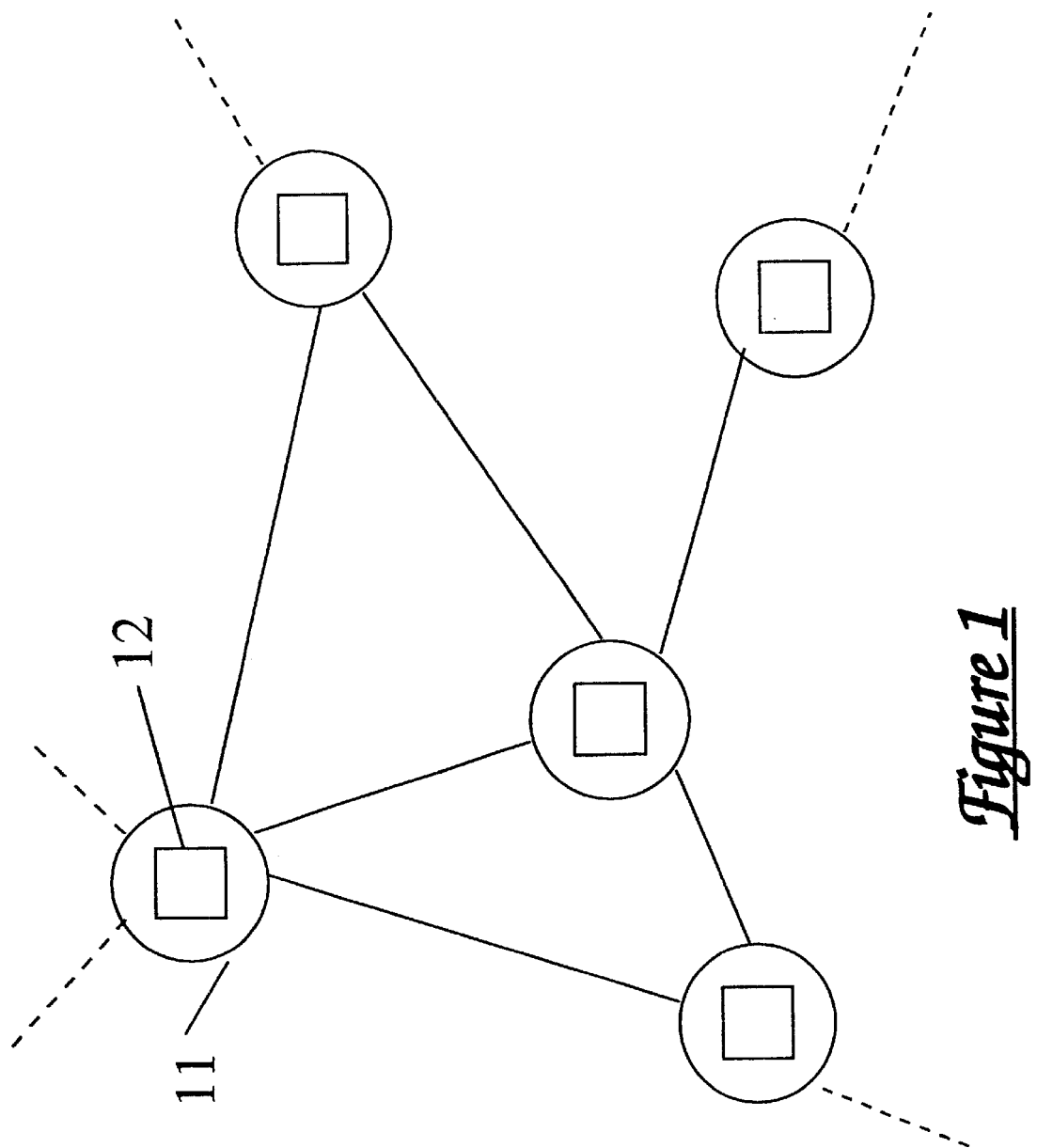
FIG. 1 is a schematic diagram of part of an IP network incorporating a number of virtual private networks.

Referring first to FIG. 1, this depicts in schematic form an IP network consisting of a mesh arrangement having a number of nodes 11 each of which incorporates an IP router 12. Each node has a number of ingress and egress ports. The network embodies a number of virtual private networks, each with its own control architecture and set of nodes. Any given node will in general constitute a node of more than one virtual private network, and each port on that node may constitute a number of virtual ports. Within each virtual private network, traffic is carried over the from node to node in packet form. As each packet arrives at a node 11, the router 12 associated with that node makes a decision on the forward path to be taken by the packet.

Figure 2:
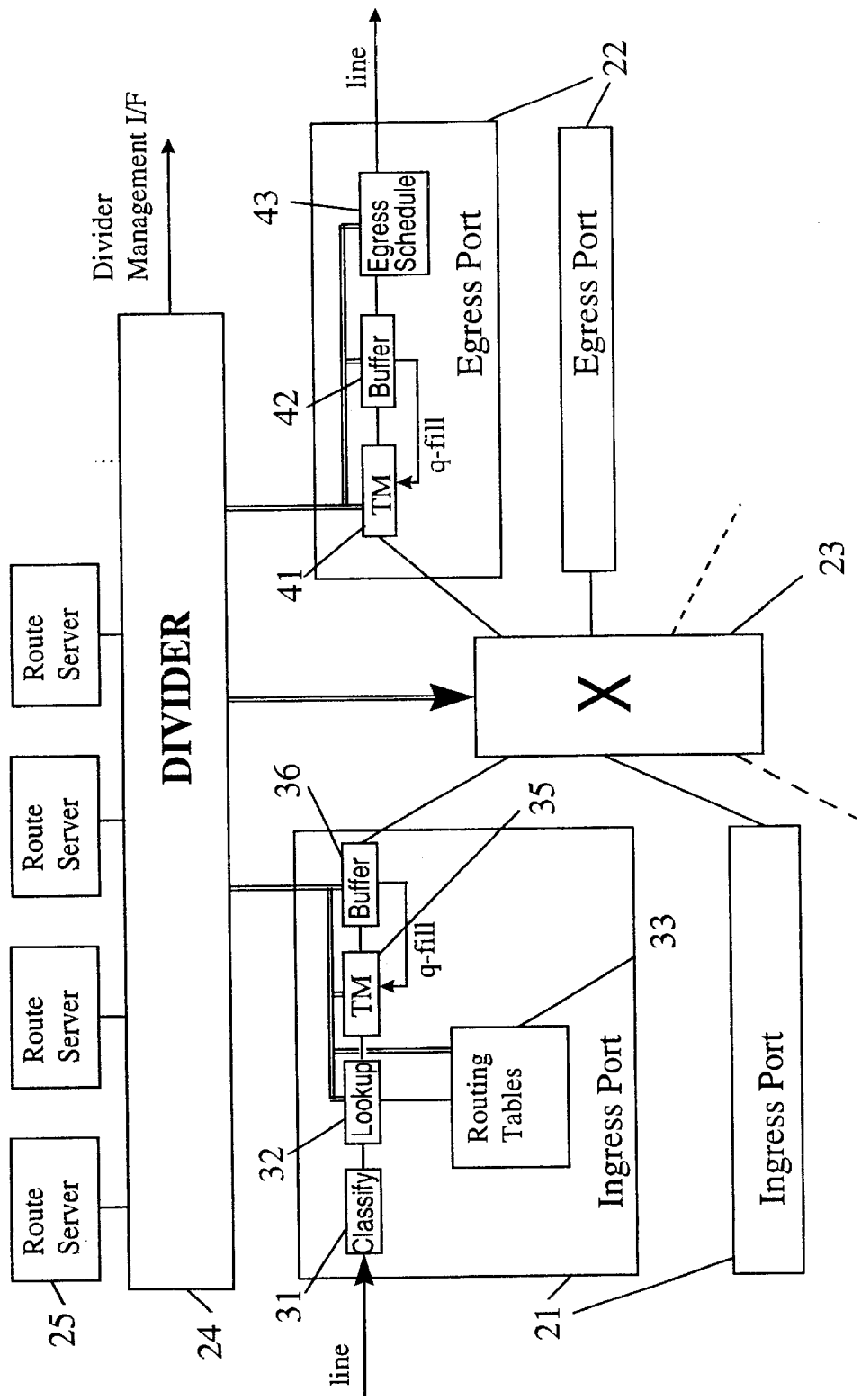
FIG. 2 shows the construction of a partitioned router for use in the network of FIG. 1.

The general construction of the IP router is shown in FIG. 2. The router includes a number of ingress ports 21, a number of egress ports 22 and a switch fabric 23 therebetween. For clarity, only one ingress port and one egress port have been shown in detail, and it will be appreciated that each of these ports will embody a respective number of virtual ports. A divider unit 24 coupled to route servers 25, one for each control architecture, controls the forwarding resources assigned to each partition of the router such that, over a period of time, each control architecture is guaranteed a minimum amount of forwarding resource irrespective of the demands of the other partitions.

At an ingress port, incoming packets from the line are fed to a classifier 31 which determines the control architecture with which that packet is associated. The packet is then passed to a look-up engine 32 which accesses the appropriate routing table from a set of routing tables 33 to determine the required egress port for the packet. The packet is next fed via an ingress traffic manager 35 to ingress buffers 36. In a preferred embodiment, a separate ingress buffer is provided for each egress port. Further subdivision of the buffer to associate a queue within the buffer to each virtual port on each egress port is also desirable. Feedback is provided from the buffers 36 to the traffic manager 35 to indicate the current fill state of the buffers and to cause the discarding of further packets should their designated queue within the buffer become full.

Packets output from the ingress buffer 36 are passed to the switching fabric 23 for routing to the appropriate egress port 22. The packets arriving at the egress port are fed via egress traffic manager 41 and egress buffer 42 to an egress scheduler 43 for output transmission to the line.

When implementing virtual routers, it is desirable to provide hard partitions between the bandwidth allocated to each control architecture on each port while allowing flexibility for the normal bandwidth management mechanisms to operate within each partition. The enhanced divider behaviour may also provide benefits when partitioning resources devoted to elastic traffic in an ATM switch.

The divider enhancement that supports partitioning of elastic flows is the virtual port at the egress from the router or switch. This requires that the divider support an abstraction of the egress scheduler on each physical port such that the port bandwidth may be divided, typically on a rate basis, between each partition allocated resource on that port prior to execution of the scheduling process within that partition.

For a conventional common memory router or switch fabric, the virtual egress port abstraction may be sufficient for the bandwidth partitioning in conjunction with management of buffer limits, since the queue-build in the common memory due to the output limitations will result in appropriate packet drop at the ingress.

For input/output buffered switches that are scaleable substantially beyond the size achievable by common memory designs, further enhancement of the divider bandwidth management abstraction is required. This is because, under certain conditions known as output blocking, traffic arriving on a number of ingress ports may be directed to the same egress port. There, the virtual port will control the rate to the line by dropping packets at the egress buffer if the queue-build exceeds the allocated limit. However, the excess traffic directed to a particular virtual port may prevent other virtual ports from receiving their full allocation of traffic, even though that allocation is being offered at the ingress. To prevent such behaviour under overload conditions, we provide backward (feedback) congestion indication across the fabric whereby egress virtual ports that detect that they are consuming excess fabric bandwidth relay this information to the ingress virtual ports that are currently causing the congestion. Preferred detection parameters include egress virtual queue-build and the rate of such queue-build. The corresponding control mechanisms at the ingress include queuing by virtual port, or packet discard criteria that include egress congestion detection as well as ingress queue-build.

It will be understood that the above description of a preferred embodiment is given by way of example only and that various modifications may be made by those skilled in the art without departing from the spirit and scope of the invention.

What is claimed is:

1. A method of operating a partitioned router in an IP (Internet Protocol) network embodying a plurality of virtual private networks, each said private network having a respective control architecture, the method comprising:

partitioning an egress port on the router to generate a virtual egress port per respective private network;

assigning forwarding processing resource to each partition of the router such that each said control architecture is guaranteed a predetermined amount of forwarding resources of the router;

detecting egress traffic blocking or overload of a said virtual egress port, and inhibiting ingress traffic in response thereto.

2. A method as claimed in claim 1, and including:

providing a forwarding routing table for each said private network; and controlling the size of each said table according to the partitioning of the router.

3. A method as claimed in claim 1, wherein at least some of said private virtual networks are arranged to carry packet voice traffic so as to provide a voice over Internet service.

4. A method as claimed in claim 1, and including:

queuing packets to be routed in buffers, and when a said buffer becomes full, discarding further packets destined for that buffer.

5. A method as claimed in claim 1, and including:

partitioning an ingress port on the router to generate a virtual ingress port per respective virtual network; and assigning forwarding processing resource to each virtual ingress port.

6. A method as claimed in claim 1, and including:

allocating bandwidth to each virtual egress port according to the partitioning of the router, and subsequently scheduling traffic within the egress port.

7. A partitioned router for use in an IP (Internet Protocol) network embodying a plurality of virtual private networks, each said private network having a respective control architecture, the router comprising:

means for partitioning an egress port of the router to generate a virtual egress port per respective private network;

means for assigning forwarding processing resources to each partition of the router such that each control architecture is guaranteed a predetermined amount of forwarding resources of the router;

means for detecting egress traffic overloading or blocking of a virtual egress port;

and means for inhibiting ingress traffic to the router in response thereto.

8. A router as claimed in claim 7 wherein a divider unit partitions the router, which divider unit limits the amount of routing table resource consumed by each said control architecture.

9. An IP (Internet Protocol) network incorporating a plurality of router nodes and embodying a plurality of virtual private networks each having a respective control architecture, wherein each said node comprises a partitioned router, which router includes:

a respective set of virtual egress ports for each said control architecture, means for assigning forwarding processing resources to each partition of the router such that each said control architecture is guaranteed a predetermined amount of the forwarding resources of the router;

means for detecting egress traffic overloading or blocking of a virtual egress port; and means for inhibiting ingress traffic to the router in response thereto.

10. A partitioned router for use in an IP (Internet Protocol) network embodying a plurality of virtual private networks, each said private network having its respective control architecture, the router having:

a plurality of ingress and egress ports, each embodying a number of virtual ports one for each said control architecture, a switch fabric between the ingress ports and the egress ports;

classifiers, one associated with each ingress port for determining the control architecture associated with each packet arriving at that ingress port;

a look-up engine arranged to determine from sets of routing tables an appropriate virtual egress port to which that packet should be directed by the switch fabric;

a divider unit for partitioning the router arranged to assign forward processing resources to each partition of the router such that each said control architecture is guaranteed a predetermined amount of the forwarding resources of the router;

means for detecting egress traffic overloading or blocking of a virtual egress port; and means for inhibiting ingress traffic to the router in response thereto.

11. A router according to claim 10 wherein the divider unit partitions the router by assigning resource to each virtual egress port.

12. A router according to claim 10 wherein the divider unit partitions the router by assigning resource to each virtual ingress port.

13. A router according to claim 10 wherein the divider unit partitions the router by limiting the amount of routing table resource consumed by each said control architecture.

* * * * *